United States Patent
Tomcik et al.

(10) Patent No.: US 6,317,607 B1
(45) Date of Patent: Nov. 13, 2001

(54) METHOD AND APPARATUS FOR REJECTING AN OVER-THE-AIR REQUEST FOR CALL INITIALIZATION

(75) Inventors: James Tomcik, Carlsbad; Dan Vassilovski, Del Mar, both of CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/333,171

(22) Filed: Jun. 14, 1999

(51) Int. Cl.[7] .................................................. H04B 7/005
(52) U.S. Cl. ........................ 455/552; 455/426; 455/414
(58) Field of Search .................................. 455/422, 417, 455/414, 411, 418, 550, 553, 575, 458, 432, 426, 556, 38.1, 567

(56) References Cited

U.S. PATENT DOCUMENTS

| | | | | |
|---|---|---|---|---|
| 5,781,858 | * | 6/1999 | Lantto | 455/414 |
| 5,797,103 | * | 8/1998 | Duda | 455/567 |
| 5,918,177 | * | 6/1999 | Corriveau et al. | 455/432 |
| 6,085,110 | * | 7/2000 | Nilsson | 455/552 |
| 6,198,923 | * | 3/2001 | Buettner | 455/433 |
| 6,253,075 | * | 6/2001 | Beghtol et al. | 455/415 |
| 6,275,692 | * | 8/2001 | Skog | 455/414 |

FOREIGN PATENT DOCUMENTS

| | | |
|---|---|---|
| 9824249 | 6/1998 | (WO) . |
| WO 98/24249 | * 6/1998 | (WO) . |

* cited by examiner

Primary Examiner—Dwayne Bost
Assistant Examiner—Joy K. Contee
(74) Attorney, Agent, or Firm—Philip R. Wadsworth; Gregory D. Ogrod; Thomas M. Thibault

(57) ABSTRACT

A method and apparatus for rejecting a request for call initialization a device capable of multi-mode communications. A user of the multi-mode wireless communication device enters one or more desired communication modes into the wireless communication device, where an indication of the selected mode(s) are stored in a memory. When a page message is received by the wireless communication device, it is examined to determine if a communication mode of an incoming call associated with the page message matches the indication of the selected communication mode(s) as stored in the memory. If a match is determined, the incoming call is accepted by the wireless communication device. If the communication mode of the incoming call does not match the indication of the selected communication mode(s), the call is rejected by the wireless communication device without interrupting the user or a call already in progress.

10 Claims, 3 Drawing Sheets

METHOD AND APPARATUS FOR REJECTING AN OVER-THE-AIR REQUEST FOR CALL INITIALIZATION

BACKGROUND OF THE INVENTION

I. Field of the Invention

The present invention relates generally to wireless communication devices and more particularly to a method and apparatus for rejecting over-the-air (OTA) requests for call initialization by a multi-mode wireless communication device.

II. Description of the Related Art

Wireless communications have become commonplace throughout the world. Today's wireless communication devices comprise analog and digital telephones operating at cellular and PCS frequencies, satellite telephones, personal computers equipped with wireless modems, wireless vehicle communication systems, and so on. In the field of wireless telephones, first generation telephones rely on analog transmission protocols to transmit voice communications. More recently, wireless telephones using digital modulation techniques have become prevalent due to the additional benefits inherent with digital technology. For example, digital wireless telephones provide for better voice clarity, fewer dropped calls, and various service options not available on analog wireless telephones.

Wireless connectivity to world-wide computer networks, such as the Internet, is becoming an increasingly desirable attribute for wireless communication devices. An increasing number of wireless applications for mobile telephony and other products using the Internet are becoming more and more common. A next generation of mobile telephones will be able to interact with the Internet with speeds approaching or exceeding speeds available on desktop computers today.

Wireless connectivity to the Internet is just one example of data communications that are, or will soon be, available to wireless communication devices. Presently, data can be transmitted either synchronously or asynchronously. Synchronous data transmission implies that a transmitter and a receiver are synchronized in time with respect to each other, the data being transmitted at specific time intervals. Asynchronous data transmission, on the other hand, uses information transmitted with the data itself to align the receiver to be able to demodulate the received data. An example of synchronous data transmission is what is commonly referred to as "packet data" transmission and is used to transfer data between a computer and the Internet using various transmission protocols, such as TCP/IP. An example of asynchronous data transmission is a dedicated connection between a transmitter and a receiver, such as two computer modems transferring data between them.

In packet data transmission applications, for example a computer connected to the Internet, data is generally sent in bursts, each burst of data usually lasting from a few seconds to minutes or longer. An example of a burst of data over the Internet occurs, for example, when a user accesses a web site. The information contained on the web site is sent to the requesting computer in data packets, which continue, more or less, until all of the requested information has been completely transmitted to the requesting computer. No data is transmitted again until another data request is received from the requesting computer.

In wireless applications, data is also sent in bursts over the air, generally from a base station to a wireless communication device. However, if a general lack of link activity is detected after a relatively short amount of time, the air interface providing a communication channel between the base station and the wireless communication device is "torn down" or de-activated. When a subsequent data request is issued by either the wireless communication device or the base station, a new communication channel must be established.

It is anticipated that in the near future, wireless telephones are expected to be able to provide multiple modes of communication to users. For example, a wireless telephone capable of both voice and data communications is expected shortly.

One problem that may arise as a result of a wireless telephone having multi-mode capability is interruptions from other calls during while the telephone is engaged in certain modes of communication, such as data communications. As stated earlier, when a wireless communication device engages in data communications, relatively lengthy delays between data transfers can often occur. In these cases, a communication channel assigned to the wireless communication may be revoked and re-assigned to another wireless communication device. During the time when no channel is assigned to the first communication device during a data communication, a second communication may be directed to the wireless communication device. The second communication may be, for example, a voice call. When the wireless communication device does not have a communication channel assigned to it, calls of any mode are able to be transmitted to the communication device. For example, a page message may be sent to a communication device requesting a call initialization, or a request to initiate communications with the wireless communication device. The page message and/or the pending voice call will generally disrupt the current data communication.

What is needed is an apparatus and method to disable communications of a first mode to a communication device capable of multi-mode communications. The need for such an apparatus and method is especially useful in applications where a user does not wish to receive calls of the first mode while a communication of a second mode is in progress. The apparatus and method will ideally not require changes to existing infrastructure, such as base stations and mobile switching centers.

SUMMARY OF THE INVENTION

The present invention is a method and apparatus for rejecting a request for call initialization to a device capable of multi-mode communications. In the exemplary embodiment, the wireless communication device comprises a wireless telephone capable of communicating in a voice mode and in a data mode.

In the exemplary embodiment of the present invention, the wireless communication device comprises a multi-mode wireless telephone and means located within the telephone to determine a communication mode of incoming communication requests. The invention further comprises means for selecting at least one desired communication mode by a wireless communication device user to identify at least one preferred communication mode in which to operate.

When at least one desired operating mode is selected by the user, a request for call initialization of an incoming call having a communication mode other than the selected mode(s) is(are) rejected by the multi-mode communication device. When a page message is received by the wireless communication device indicating a request for call initialization, or the availability of an incoming call, the page message is examined to determine which communication mode is being requested by the incoming call. If the communication mode of the incoming call matches at least one of the selected communication modes selected by the user, the wireless communication device will generally issue a page response, accept the incoming call. If the communication mode of the incoming call does not match at least one of the selected communication modes, a page response message is transmitted by the wireless communication device, either rejecting the incoming call, or requesting an alternative communication mode.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is a method and apparatus for rejecting a request for call initialization to a device capable of multi-mode communications. Such an invention is useful when it is desired to operate the wireless communication device in one mode, without interruptions by communications in other modes. In the exemplary embodiment, the apparatus of the present invention comprises a multi-mode wireless telephone and means located within the telephone to detect a request for call initiation contained within a paging message directed to the wireless telephone. The request for call initialization is a request to the wireless communication device indicating the availability of an incoming communication. The invention further comprises means for selecting at least one desired communication mode by a wireless communication device user to identify at least one preferred communication mode in which to operate.

Although the teachings of the present invention are described with respect to a terrestrial-based, wireless communication system, and specifically to a wireless telephone capable of two modes of operation, it should be understood that the present invention is not so limited. For example, the present invention may be used in any wireless communication system and be used in devices such as a satellite communication devices or pagers, or any wireless communication device having at least two modes of operation. As used throughout this specification, the term "mode" refers to a type of communication, for example, voice communications or data communications.

Figure 1:
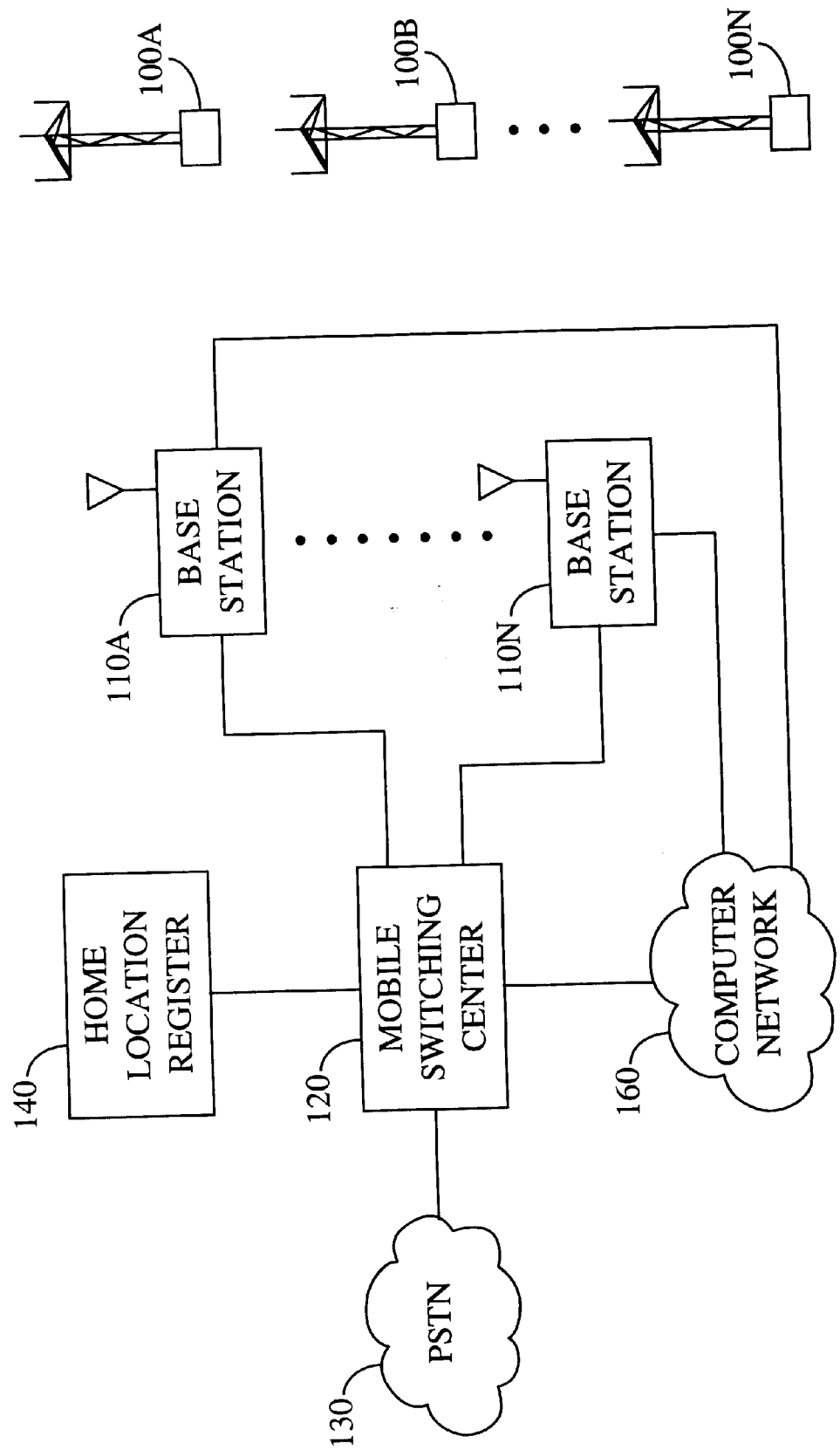
FIG. 1 is an illustration of a typical wireless communication system in which the present invention is used.

FIG. 1 is an illustration of a typical terrestrial-based, wireless communication system in which the present invention is used. It should be understood that the components shown in FIG. 1 are merely representative of one mode of wireless communication system and that other communication systems may use different components in order to achieve similar results. The present invention, therefore, is not intended to be limited to the system shown in FIG. 1.

In the wireless communication system of FIG. 1, multi-mode, wireless communication devices, otherwise referred to herein simply as wireless communication devices, are shown as wireless communication devices 100a, 100b, and 100n, a single wireless communication device being assigned to each user in the system. The designations a, b, and n on the wireless communication device identifiers correspond respectively to a first user, a second user, and an nth user, representing "n" number of users in the communication system. Although only three wireless communication devices 100 are shown in FIG. 1, it should be understood that a wireless communication system typically comprises many thousands of users.

Referring again to FIG. 1, Mobile Switching Center (MSC) 120 typically includes interface and processing circuitry for providing system control to base stations 110a through 110n, representing one through "n" base stations comprising the wireless communication system. Base stations are well known in the art for transmitting and receiving communication signals to and from wireless communication devices. Each base station 110 provides a coverage area ranging up to several miles in radius from the base station location. As wireless communication devices travel within the coverage area of each base station, communication signals to be transferred to and from the wireless communication device are routed generally through the particular base station to which the wireless communication device is most closely located.

MSC 120 provides circuitry for routing communications between wireless communication devices operating in various base station coverage areas, as well as between remote stations and land-line telephone users through a Public Switch Telephone Network, shown in FIG. 1 as PSTN 130. MSC 120 may, alternatively, or in addition to, be connected to computer network 160 to provide communications between wireless communication devices in the communication system and various known computing devices connected to computer network 160, such as personal computers, mainframe computers, digital cameras, email systems, remotely controlled devices, and so on.

MSC 120 typically comprises a telecommunications switch (not shown) and a Base Station Controller (BSC) (also not shown). The telecommunication switch provides a switching interface to PSTN 130 while the BSC provides the necessary hardware and software for communications to take place between base stations. MSC 120 typically provides other functions in the communication system as well, such as billing services and data services.

MSC 120 may be coupled to the base stations by various means such as dedicated telephone lines, optical fiber links, or microwave communication links. When a call is initiated by a wireless communication device, a paging message is transmitted to one or more base stations proximate to the wireless communication device initiating the call, generally over a paging channel. The paging message is routed to MSC 120, where it is processed and routed either to PSTN 130 or to one or more base stations proximate to a wireless communication device for which the call is intended. When a call is initiated from PSTN 130, a paging message is received by MSC 120 where it is then converted into a format suitable for the particular wireless communication system. For example, in a typical CDMA communication system, the paging message is converted into a general page message, which is defined by international telecommunication standard IS-95, and variations thereof. The general page message is then routed to one or more base stations proximate to the wireless communication device for which the call is intended.

In the exemplary embodiment, wireless communication device 100 is able to communicate in at least two modes, or types, of communications, data communications and voice communications. Data communication mode is used when it is desirous to send or receive information generally suitable for digital computational devices, such as laptop computers. Data is generally transmitted in discreet segments called packets. Each data packet generally contains overhead information used for a variety of purposes. For example, many data packets contain a data field used to store an error detection code. The error detection code is used to check a received data packet to ensure that it was received intact; that is, the data was not corrupted during the transmission process.

Voice communication mode is used when it is desirous to transmit acoustic information, including human speech, facsimile tones, music, or other audible forms of communication. In voice communication mode, audio information is transmitted using one or more well-known wireless communication modulation techniques, such as CDMA, TDMA, AMPS, and others. During typical voice communications, an over the air channel is established between one or more base stations and a wireless telephone. The channel is maintained throughout the duration of the voice call, no matter how much or little voice activity is occurring between the wireless telephone and the base station. In many instances, voice date is digitized and formatted into packets prior to transmission. Voice packets differ from data packets in that no information as to a destination address is contained within the voice packets. That is, a connection is first established between two locations, then voice data is transmitted between the two locations. No address information need be contained within the voice packets as the source and destination of the voice packets are predetermined by the connection.

Data mode may further include a capability of transmitting voice in certain applications. In this scenario, voice is digitized using techniques well known in the art. The digitized voice signals may be encrypted to provide for secure voice transmissions over the air. The digitized voice signals are then formatted into data packets, which are then transmitted over the air using well-known data transmission protocols. As explained above, each data packet contains information is to the address, or destination, of where the data packet is to arrive.

When a wireless communication device engages in data communications, otherwise known as a data call, information generally does not flow continuously over the air interface. More commonly, data is transmitted in bursts of information, for example, when an electronic document is requested by a wireless modem connected to a laptop computer. The air interface is used for only as long as it is needed to transmit the document. The period of time during which data is actively being transmitted over an air interface is called the "active" state, or "connected" state. The active state also includes a predefined period of time after a data burst has been transmitted over the air interface, sometimes referred to as "hang time", during which no data is being transmitted. If no data is transmitted over the air interface after the predefined period of time, for example 20 seconds after the last time any data was transmitted over the air interface, the active state expires, and a dormant state is entered. In the dormant state, the air interface originally assigned to a wireless communication device is released, generally by either the base station or the mobile switching center through which the wireless communication device was communicating. However, data calls are often not completed upon entering the dormant state. In many cases, there is simply a long pause in between data transmissions between a wireless communication device and a host computer, for example.

Upon expiration of the active state, the air interface assigned to the wireless communication device is re-allocated to another wireless communication device as needed to transmit voice or data communications. The re-allocation of under-utilized air interfaces is a technique used to improve the efficiency and maximize capacity of the communication system.

During the dormant state, wireless communication device 100 is able to quickly re-establish another air interface when needed. This is because certain operational parameters of the data call are stored within the communication device and the device to which the communication device was in contact with. For example, during a data call, a wireless communication device is assigned an IP address, typically by the base station that the communication device is communicating through. An IP address is a well-known 4-digit code for uniquely identifying a remote computer to a computer network, such as the Internet. An IP address, in the present example, is used to identify the wireless communication device to the device that it was in contact with prior to entering the dormant state, for example, a host computer. An air interface can be quickly re-established to the wireless communication device if the original IP address assigned to the communication device is maintained during the dormant state. However, if a second communication is received by the wireless communication device while in the dormant state, such as a voice call, information pertaining to the data call, such as the IP address, must be re-established once the second communication has been accepted by the wireless communication device.

During the active state, for example during periods when data is being transmitted to or from the wireless communication device or during the "hang time" period, MSC 120 will not forward other calls, such as voice calls, to the wireless communication device. Each time a call is received by MSC 120 destined for a particular wireless communication device, MSC 120 determines whether or not an air interface, otherwise known as a traffic channel, is currently assigned to that device. If a traffic channel is currently assigned to the wireless device, in other words the wireless device is in the active state, calls destined for that particular wireless device are either forwarded to an alternative destination, such as a voice mail system, or a busy signal is sent to the call originator indicating that the particular wireless communication device is not available to take calls at the moment. In other situations, calls are forwarded to the particular wireless communication device even if a traffic channel is currently assigned, if a "call waiting" feature is enabled for the particular wireless device. In this case, a page message is sent by MSC 120 to the particular wireless communication device, indicating that a second call is available to be received, if desired. The wireless communication device user may accept the second call, while maintaining the first call.

On the other hand, during the dormant state of a data call, wireless communication device 100 is susceptible of receiving other calls being transmitted to it, thereby interrupting the data call that is in progress. In the dormant state, no traffic channel is assigned to wireless communication device 100, so MSC 120 is able to transmit other calls to it. In certain circumstances, a wireless communication device user will only wish to receive calls of a certain mode, for instance, data calls only.

Figure 2:
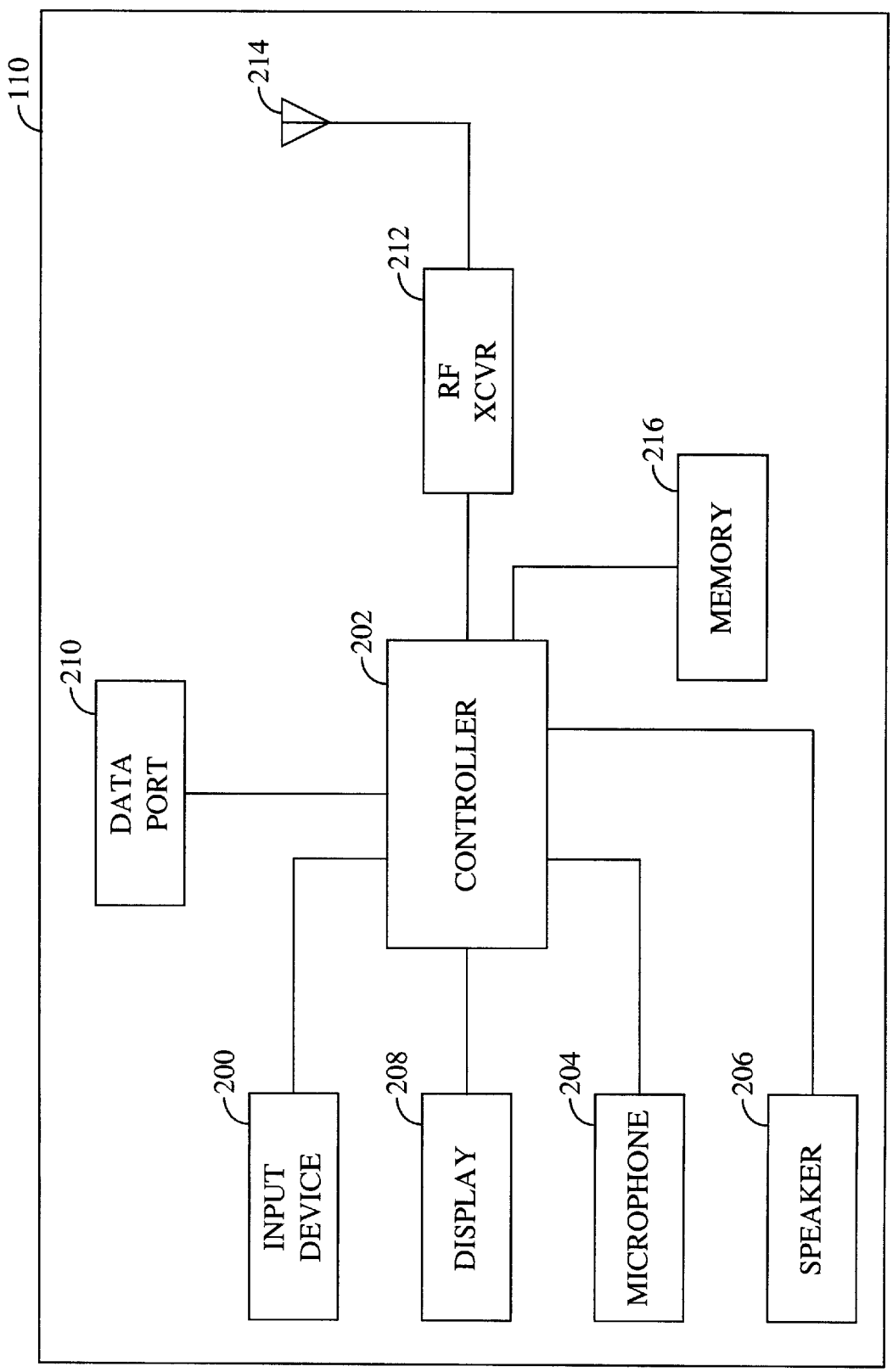
FIG. 2 illustrates the functional components of a wireless communication device used in the wireless communication system of FIG. 1, shown in block diagram format.

FIG. 2 illustrates the functional components of a wireless communication device, or wireless communication device, 100, shown in block diagram format. Wireless communication device 100 is capable of multi-mode communications, meaning that it can operate in several modes of communications, such as voice communications or data communications. It should be understood that voice communications comprise any audio information including speech, music, or audible tones used for call processing, modems, and facsimile machines. Data communications comprise synchronous or asynchronous data transmission. In addition to these modes, wireless communication device is also capable of other modes of communications as well.

A user of wireless communication device 100 initiates communications generally by using input device 200. Input device 200 comprises a keypad in the exemplary embodiment, however, input device 200 could be any device which accepts user commands, such as a voice response device which converts voice commands into electrical signals suitable for processing by controller 202. During voice communications, the user speaks into microphone 204, which transforms acoustic energy into electrical energy and sends the electrical signals to controller 202 for processing. Microphone 204 may be substituted for input device 200 in an application where a second audio input device is undesirable. In many instances, a voice encoder/decoder, generally known as a Codec, is used between microphone 204 and controller 202, or is incorporated within controller 202, to convert the electrical signals from microphone 204 into a format more suitable for transmission over a limited bandwidth air interface. Speaker 206 is used to convert received electrical signals into acoustic signals. Speaker 206 may comprise a speaker suitable for low volume acoustic outputs, typically for use in a traditional telephone application, or speaker 206 may comprise a loudspeaker, suitable for high volume acoustic outputs, typically for use in a dispatch applications. In another embodiment, speaker 206 may comprise a combination of the high volume and low volume acoustic speakers, commonly in use and readily available.

Wireless communication device 100 further comprises display 208 for allowing a user to view operational characteristics of the wireless communication device. Such displays are common in many of today's wireless devices including telephones and remote data terminals.

Data port 210 serves as an interface between controller 202 and external hardware devices. Data port 210 generally allows a variety of bi-directional data communications to take place between wireless communication device 100 and the external device. Such external devices include laptop computers, facsimile machines, and remote data terminals, among others.

When a user initiates voice or data communications, an identification code corresponding to a second communication device, generally a telephone number, is entered using input device 200. In the exemplary embodiment, input device 200 comprises keys corresponding to digits 0 through 9, as well as additional function keys, such as SEND, END, and so forth. Input device 200 may also comprise one or more keys used to classify an outgoing communication as being a data communication or a voice communication. For example, a user wishing to initiate a data communication might press a key designated for data communications, then dial a telephone number corresponding to a data device that the user wishes to communicate with. In one embodiment, all calls from wireless communication device 100 are assumed to be voice calls, unless classified as some other mode of communication, as described by one of the methods above.

Controller 202 serves as the main computational unit of wireless communication device 100. Although controller 202 is shown as a single element in FIG. 2, it should be understood that controller 202 may comprise one or more individual components such as one or more Application Specific Integrated Circuits (ASICs) or a microprocessor from Intel Incorporated of Santa Clara, Calif. in combination with memory devices, bus controllers, and other support devices well known to those skilled in the art.

Among other functions, controller 202 is responsible for receiving instructions from a user via input device 200. For example, controller 202 may receive a signal, corresponding to a telephone number, from input device 200 along with a signal to initiate communications with a second communication device located remotely from the first communication device. In addition to the telephone number and the initiation signal, controller 202 may also receive a signal from input device 200 indicating which mode of communications are to be initiated.

Calls to wireless communication device 100 are indicated generally by producing an audible alert, such as a typical ring produced by many telephones in use today. The audible alert is generated in response to a series of page messages sent between a base station 110 and wireless communication device 100, generally over a paging channel. In the exemplary embodiment, a page message sent by base station 110 is referred to as a general page message and a page message sent by wireless communication device is referred to as a page response message, per the teachings of IS-95, referenced above. It should be understood that other wireless modulation methods, including TDMA, AMPS, and FDMA, use a similar page messages to alert wireless devices of incoming calls.

A general page message transmitted from base station 110 informs wireless communication device 100 that an incoming call is available to be received. In response to the general page message, wireless communication device 100 sends a page response message, generally accepting the incoming call. Base station 110 responds with another page message which informs wireless communication device 100 of a traffic channel on which to receive the incoming call. Should a general page message be received by wireless communication device 100 during a data call while in the dormant state, the data call will be disrupted if the user chooses to accept the incoming call.

The present invention effectively disables calls of at least one communication mode to wireless communication device 100 by allowing a user to select one or more desired communication modes in which to operate. Incoming calls having a communication mode different than the selected mode(s) are rejected by the wireless communication device.

A wireless communication device user may select one or more desired operating modes, generally at any time. When a page message is received by the wireless communication device indicating a request for call initiation, a field contained within the page message is examined to determine if the communication mode of the associated incoming call matches at least one of the selected modes chosen by the user. If a match is determined, the call will proceed in a normal manner by transmitting a page response message to the base station accepting the call and alerting the user of the incoming call. If a match is not determined, wireless communication device 100 will respond to the page message by sending a page response message either rejecting the incoming call, or requesting an alternative communication mode. This effectively disables calls having different communication modes other than the selected mode(s) from being received by wireless communication device 100.

Referring to FIG. 2 again, a user of wireless communication device 100 enters a desired mode(s) of communication using input device 200. The user may enter the desired mode(s) generally at any time, often just prior to initiating communications of the chosen mode. For example, just prior to initiating a data call, a user can select data communication mode as the desired communication mode, so that voice calls to wireless communication device 100 will be rejected.

In the exemplary embodiment, a user selects the desired mode(s) of communication by pressing a predefined key or key sequence using input device 200. The request may alternatively be generated by an audio command, if input device 200 is responsive to audio commands. Alternatively, a desired mode of communication may be automatically generated by controller 202 any time a communication of any one mode of communication is commenced. For example, if a data call is initiated by the wireless communication device user, controller 202 will automatically select data mode as being the desired operating mode, thereby rejecting calls having operating modes different than data mode from being accepted by wireless communication device 100.

The selected communication mode(s) may be cancelled in several ways. A default condition can be defined wherein the selected communication mode(s) is(are) enabled only until the conclusion of a communication of the selected mode. For example, a user could select data communication mode, place a data call, and at the conclusion of the data call, wireless communication device 100 would automatically be re-configured by controller 202 to accept calls of any mode. Alternatively, the selected mode(s) will remain active until a second command is entered by the user, indicating a desire to cancel the previously selected mode(s). Another way in which the selected communication mode(s) may be cancelled is for the user to select a different communication mode(s) to input device 200 than what was previously chosen.

The selected communication mode(s) is(are) entered using input device 200, which provides the information to controller 202. Controller 202 stores an indication of the selected communication mode(s) in memory 216. Memory 216 is a well-known device used to store information represented in digital format. Examples of memory 216 include random access memory (RAM), electrically erasable programmable read-only memory (EEPROM), non-volatile memory, and other well-known storage devices.

When a page message is received by RF transceiver 212, it is examined by controller 202 to first determine if the page message is intended for wireless communication device 100, using techniques well known in the art, and in the exemplary embodiment, described in detail in IS-95. If controller 100 determines that the page message is intended for wireless communication device 100, controller 202 then determines if the page message indicates a request for call initialization, or the availability of an incoming call, by examining, in the exemplary embodiment, the MSG_TYPE field in the page message. Again, it should be emphasized that page message formats will vary for different communication systems, and that the present invention is not intended to be limited to a CDMA communication system.

If the page message indicates the availability of an incoming call, controller 202 then examines if a service option field contained within the page message matches the desired communication mode(s) indication as stored in memory 216. The service option field identifies the communication mode of the incoming call. If a match is determined between the desired communication mode(s) indication as stored in memory 216 and the mode of communication identified in the service option field, a page response message is sent by wireless communication device 100 indicating that the call is of the desired mode, and for base station 110 to provide further details of the call, such as which traffic channel to tune to in order to receive the call. This process effectively accepts the call. Also upon a match, the user is alerted to the availability of the call, such as by an audible alert.

If the communication mode identified in the service option field does not match the desired communication mode(s) indication as stored in memory 216, a page response message is sent by wireless communication device 100 indicating that the call was not of the desired communication mode, and that the call is rejected. Alternatively, wireless communication device 100 will send a page response message indicating the communication mode(s) that it is willing to accept, in other words, the communication mode(s) selected by the user. In either case, the user will not be alerted to the incoming call, and the incoming call will not be forwarded by base station 110 to wireless communication device 100. This prevents communications of undesired modes from being received by wireless communication device 100.

Figure 3:
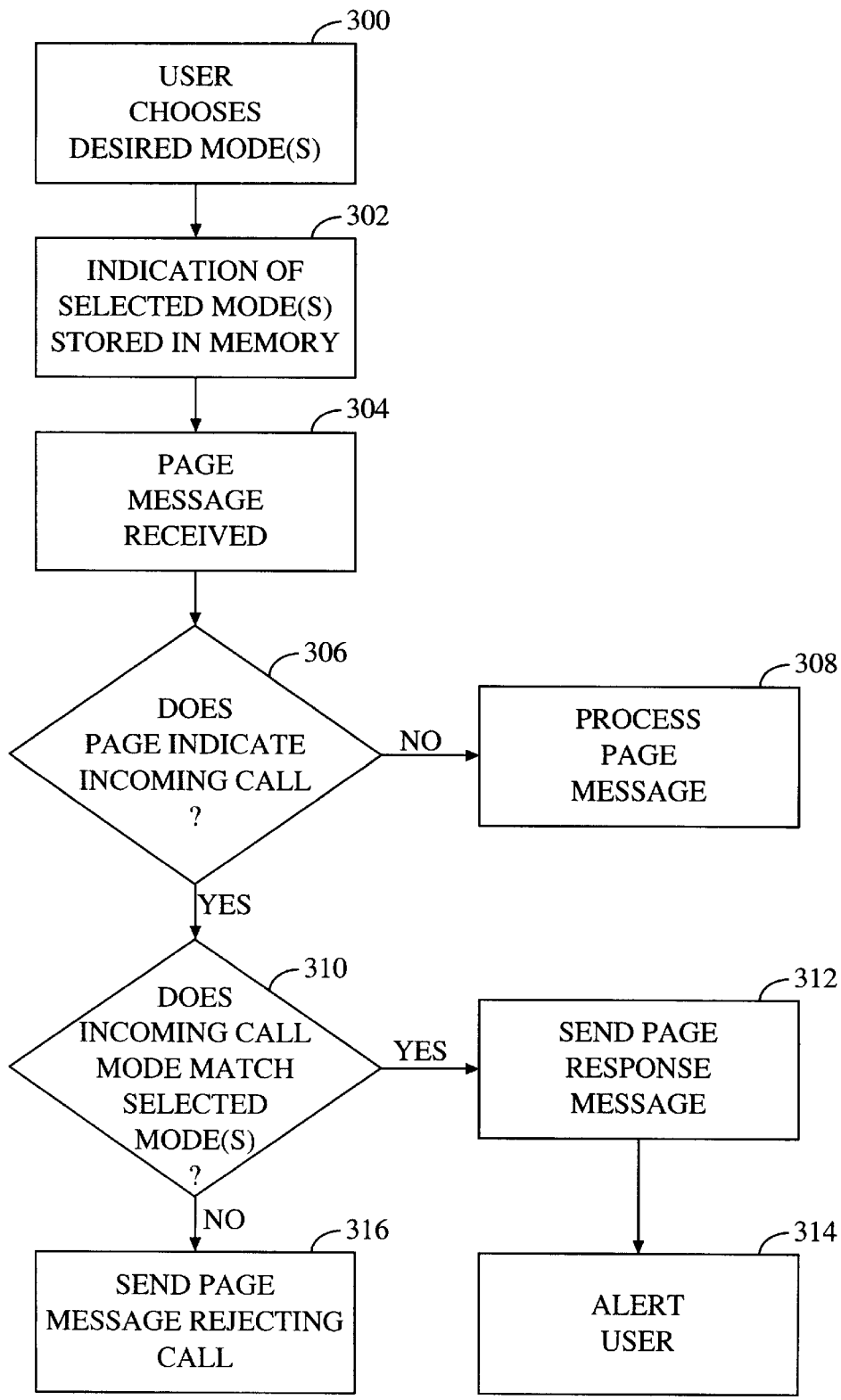
FIG. 3 illustrates the method of the present invention, shown as a flowchart diagram.

FIG. 3 illustrates the method of the present invention, shown as a flowchart diagram. The steps of the present invention are carried out any time that a user of a multi-mode wireless communication device 100 desires to disable communications of at least a first mode to wireless communication device 100. In the exemplary embodiment, the first mode is defined as voice communications and a second mode is defined as data communications. Often, a user will desire to prevent the first mode of communications from being transmitted to communication device 100 if the user will be engaged in communications of the second mode.

In step 300, a user of multi-mode wireless communication device 100 selects one or more desired communication modes using input device 200. The selected mode(s) may be entered by pressing one or more keys on a keypad, by audio commands, or other methods well known in the art. In another embodiment, the communication mode is set automatically generated by controller 202 any time a communication of any one mode of communication is commenced.

In step 302, an indication of the selected communication mode(s) are stored in memory 216. If a previous communication mode or modes have already been stored in memory 216, the previous mode(s) is(are) overwritten by controller 202, or the user is prompted for instructions of whether to overwrite the previous mode(s) or not. After the indication of the selected mode(s) of communication have been stored in memory 216, the user is free to transmit calls in any available mode and await page messages from a base station(s) in communication with wireless communication device 100.

In step 304, a page message is received by wireless communication device 100. Controller 202 examines the page message to determine if it is intended for wireless communication device 100, using techniques well-known in the art. If the page message is not intended from wireless communication device 100, the page message is ignored, and no further action is taken. If the page message is intended for wireless communication device 100, processing continues to step 306.

The received page message could be one of a number of different page messages, each type of page message conveying or requesting information to and from wireless communication device 100. Processor 202 examines the received page message to determine if it is a page message indicating a request for call initialization, or the availability of an incoming call, generally by interrogating a "message type" field contained within the received page message. If controller 202 determines that the received page message is something other than a request for call initialization, the received page message is processed in step 308 in accordance with predefined procedures for the particular type of page message received. If controller 202 determines that the received page message indicates the availability of an incoming call, processing continues to step 310.

In step 310, the page message is examined by controller 202 to determine if a communication mode of the incoming call associated with the page message matches the indication of the selected communication mode(s) as stored in memory 216. In the exemplary embodiment, the communication mode of the incoming call is located in a SERVICE_OPTION field of the page message.

If the incoming call mode matches the indication of the selected communication mode(s) as stored in memory 216, a page response message is transmitted by wireless communication device 100 in step 312, requesting further information instructions from base station 110 for call acceptance. Optionally, in step 314, the user is alerted that an incoming call has been received, so that the user can take appropriate action in response to the alert. For instance, the user may respond to the call by pressing a predefined key on input device 200 to answer a voice call.

If the incoming call mode does not match the indication of the selected communication mode(s) as stored in memory 216, processing continues to step 316, where a page response message is transmitted by wireless communication device 100, rejecting the call. The page response message may reject the incoming call by transmitting an indication of the selected communication mode(s), as stored in memory 216, that wireless communication device is able to receive. Or, the page response message may reject the incoming call without transmitting an indication of the selected communication mode(s) that are stored in memory 216. In either case, the incoming call is rejected by wireless communication device 100 without disturbing the user, or disrupting a call already in progress. In another embodiment, the user is alerted to the rejection, either by an audible, visual, or tactile alert, without disrupting a call already in progress. A call in progress is interrupted if the call in progress is disconnected or "dropped", either temporarily or permanently.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for rejecting a request for call initializtion to a device capable of multi-mode communications. comprising:

a multi-mode communication device capable of communications in at least two modes;

means for selecting at least one of said modes as a desired communccation mode by a user of said multi-mode communication device;

a memory for storing an indication of said selected communication modes(s);

a tramsceiver for reciving a page message and for transmitting a page message reaponse; and a controller connected to said selecting means, to said memory, and to said transceiver, for comparing a communication mode of an incoming call associated with said page message to said indication stored in said memory, and for rejecting said incoming call if said communication mode of said incoming call does not match said indication stored in said memory.

2. The apparatus of claim 1 wherein a first of said modes comprises a voice mode and a second of said modes comprises a data mode.

3. A method for rejecting a request for call initialization to a device capable of multi-mode communication, comprising the steps of:

selecting at least one desired communication mode from at least two communication modes for a multi-mode communication device;

storing an indication of said selected cimmunication modes(s) in a memory;

receiving a page message by said multi-mode communication device; and rejecting an incoming call associated with said page message if a communication mode of said incoming call does not match said indication stored in said memory.

4. The method of claim 3 wherein said at least two communicatio modes comprises a voice communication mode and a data communication mode.

5. The method of claim 3 wherein the step of rejection an incoming call associated with said page message comprises the step of transmitting a page response message to a base station in communication with said multi-mode communication device.

6. The method of claim 3 wherein the step of rejecting an incoming call associated with said page message comprises the step of transmitting a page response mesage to a base station in communication with said multi-mode communication device, said page response message indicating which of said communication modes said multi-mode communication device is selected to receive.

7. The method of claim 6 further conmprising the step of alerting said user of said rejection without interrupting a call already in progress.

8. The method of claim 3 further comprising the step of accepting said incoming call if said communication mode of said incoming call matches said indication stored in said memory.

9. The method of claim 3 wherein the step of selecting at least one desired communication mode is performed by a multi-mode communication mode is performed by a multi-mode communication device user.

10. The method of claim 3 wherein the step of selecting at elast one desired communication mode is performed automatically when a call of a particular mode is initiated at said multi-mode communication device.

* * * * *